(12) United States Patent
Sancaktar

(10) Patent No.: US 9,707,704 B2
(45) Date of Patent: Jul. 18, 2017

(54) SURFACE ENHANCEMENT BY INCORPORATION OF MAGNETIC PARTICLES BY ELECTROMAGNETIC MOLDS, ROLLERS, COATING BLADES AND BRUSHES

(71) Applicant: Erol Sancaktar, Tallmadge, OH (US)

(72) Inventor: Erol Sancaktar, Tallmadge, OH (US)

(73) Assignee: The University of Akron, Akron, OH (US)

(*) Notice: Subject to any disclaimer, the term of this patent is extended or adjusted under 35 U.S.C. 154(b) by 347 days.

(21) Appl. No.: 14/401,229

(22) PCT Filed: Jun. 3, 2013

(86) PCT No.: PCT/US2013/043836
§ 371 (c)(1),
(2) Date: Nov. 14, 2014

(87) PCT Pub. No.: WO2013/181650
PCT Pub. Date: Dec. 5, 2013

(65) Prior Publication Data
US 2015/0129124 A1    May 14, 2015

Related U.S. Application Data

(60) Provisional application No. 61/654,228, filed on Jun. 1, 2012.

(51) Int. Cl.
*B29C 31/00* (2006.01)
*B29C 70/88* (2006.01)
*B60C 11/14* (2006.01)

(52) U.S. Cl.
CPC .............. *B29C 31/00* (2013.01); *B29C 70/88* (2013.01); *B60C 11/14* (2013.01); *B29K 2995/0008* (2013.01); *B60C 2011/142* (2013.01); *B60C 2011/145* (2013.01)

(58) Field of Classification Search
CPC .................................................... B29C 31/00
See application file for complete search history.

(56) References Cited

U.S. PATENT DOCUMENTS

| | | | | |
|---|---|---|---|---|
| 4,699,578 A | * | 10/1987 | Sumner | B29C 33/06 264/315 |
| 5,545,368 A | * | 8/1996 | Vinarcik | B22D 19/02 264/310 |
| 2009/0056845 A1 | * | 3/2009 | Sandstrom | B60C 1/0025 152/151 |
| 2010/0296996 A1 | * | 11/2010 | Ohta | B82Y 30/00 423/447.7 |
| 2011/0269855 A1 | * | 11/2011 | Marc | C08J 11/10 521/41 |

* cited by examiner

*Primary Examiner* — Daniel McNally
(74) *Attorney, Agent, or Firm* — Renner Kenner Grieve Bobak Taylor & Weber

(57) ABSTRACT

A method for applying a magnetic element to a surface includes the steps of providing a magnetized surface capable of holding a magnetic element, providing a substrate having a surface to be modified by the addition of the magnetic element, bringing the magnetic element into contact with the surface of the substrate, eliminating the magnetism of the magnetized surface to create an un-magnetized surface, and withdrawing the un-magnetized surface from contact with the surface of the substrate, thereby leaving behind the magnetic element on the surface of the substrate.

18 Claims, 11 Drawing Sheets

SURFACE ENHANCEMENT BY INCORPORATION OF MAGNETIC PARTICLES BY ELECTROMAGNETIC MOLDS, ROLLERS, COATING BLADES AND BRUSHES

CROSS-REFERENCE TO RELATED APPLICATIONS

The present application claims the benefit of U.S. Provisional Application No. 61/654,228, filed Jun. 1, 2012.

FIELD OF THE INVENTION

This present invention generally relates to applying magnetic elements to a surface, and more particularly relates to applying magnetic elements to surface of a tire to reduce tread surface wear. The incorporation of magnetic elements can lead to enhanced surface properties such as electrical conduction, heat conduction, wear resistance and surface strength.

BACKGROUND OF THE INVENTION

The chief cause of tire failure is the wearing away of tire tread as a result of friction from moving contact with road surfaces. Having tire treads that are worn away or beginning to wear away is a dangerous problem for all motorists. The more durable and resistant to tread surface wear that a tire is, the safer the tire becomes. It has been discovered that the introduction of magnetic elements onto the surface of rubber reduces micro tears and fibrillation in the rubber, while at the same time increasing the heat transfer and durability of the rubber. However, simply adding magnetic elements to the master batch of the various components that make a tire does not work. Such a method of magnetic element incorporation is inefficient and does not allow for the localization of the magnetic elements on the surface of the tire tread. Therefore, there is a need in the art for a method of applying a magnetic element to a surface of a tire to increase the durability of the surface and to reduce surface wear. With the understanding that this need exists in tire technology, it will be appreciated that the art might benefit more broadly from a method a applying magnetic elements to other surfaces.

SUMMARY OF THE INVENTION

A first embodiment of this invention provides a method for applying a magnetic element to a surface, comprising the steps of: providing a magnetized surface holding a magnetic element; providing a substrate having a surface to be modified by the addition of the magnetic element; contacting the magnetized surface with the surface of the substrate so as to bring the magnetic element into contact with the surface of the substrate; thereafter eliminating the magnetism of the magnetized surface, thus creating a un-magnetized surface; thereafter withdrawing the un-magnetized surface from contact with the surface of the substrate, thereby leaving behind the magnetic element on the surface of the substrate.

A second embodiment provides a method as in the first embodiment, wherein the magnetized surface is chosen from the group consisting of a mold, a coating blade, a brush, or a roller.

A third embodiment provides a method as in either the first embodiment or the second embodiment, wherein the magnetized surface is magnetized with a supply voltage in the range of 2 volts to 20 volts direct current, or 110 or higher volts alternating current.

A fourth embodiment provides a method as in any of the first through third embodiments, wherein the magnetic element is chosen from the group consisting of magnetic whiskers, magnetic fibers, magnetic nanofibers, magnetically coated particles, magnetically coated whiskers, magnetically coated fibers, magnetically coated nanofibers and combinations thereof.

A fifth embodiment provides a method as in any of the first through fourth embodiments, wherein the substrate having a surface is chosen from the group consisting of a synthetic rubber substrate, a natural rubber substrate, a cured silicon substrate, ferromagnetic particles, metallic particles, thermoplastic based materials, thermoset based materials, inorganic materials and combinations thereof.

A sixth embodiment provides a method as in any of the first through fifth embodiments, wherein the substrate having a surface has tack strength in the range of 10 N to 72 N.

A seventh embodiment provides a method as in any of the first through sixth embodiments, wherein the substrate having a surface is heated to a temperature to soften and even to liquefy the surface from between environmental temperature and surface liquefaction temperature.

An eighth embodiment provides a method as in any of the first through seventh embodiments, wherein the magnetized surface is contacted with the surface of the substrate with a pressure of between 5 kPa to 352 kPa.

A ninth embodiment provides a method as in any of the first through eighth embodiments, wherein the mold is a tire mold.

A tenth embodiment provides a method as in any of the first through ninth embodiments, wherein the magnetic particle is chosen from nickel powder or iron powder and combinations thereof.

An eleventh embodiment provides a method as in any of the first through tenth embodiments, wherein the magnetic nanofiber is electrospun nickel in the form of a nanofiberic mat.

A twelfth embodiment provides a method as in any of the first through eleventh embodiments, wherein the synthetic rubber substrate is in the form of a tire.

A thirteenth embodiment provides a method as in any of the first through twelfth embodiments, wherein the said step of providing a magnetized surface holding a magnetic element includes electrospinning the magnetic element directly onto the magnetized surface.

A fourteenth embodiment provides a method as in any of the first through thirteenth embodiments, wherein the magnetized surface is a magnetized tire mold and wherein the substrate is a tire blank.

A fifteenth embodiment provides a method as in any of the first through fourteenth embodiments, wherein the magnetic element is chosen from the group consisting magnetic whiskers, magnetic fibers, magnetic nanofibers, magnetically coated particles, magnetically coated whiskers, magnetically coated fibers, magnetically coated nanofibers and combinations thereof.

A sixteenth embodiment provides a method as in any of the first through fifteenth embodiments, wherein the tire blank having a surface is made from the group consisting of synthetic rubber, natural rubber, cured silicon, and combinations thereof.

A seventeenth embodiment provides a method as in any of the first through sixteenth embodiments, wherein the tire blank having a surface has tack strength in the range of 10 N to 72 N.

An eighteenth embodiment provides a method as in any of the first through seventeenth embodiments, wherein the said step of providing a magnetized tire mold holding a magnetic element includes electrospinning the magnetic element directly onto the magnetized tire mold.

DETAILED DESCRIPTION OF ILLUSTRATIVE EMBODIMENTS

Figure 1:
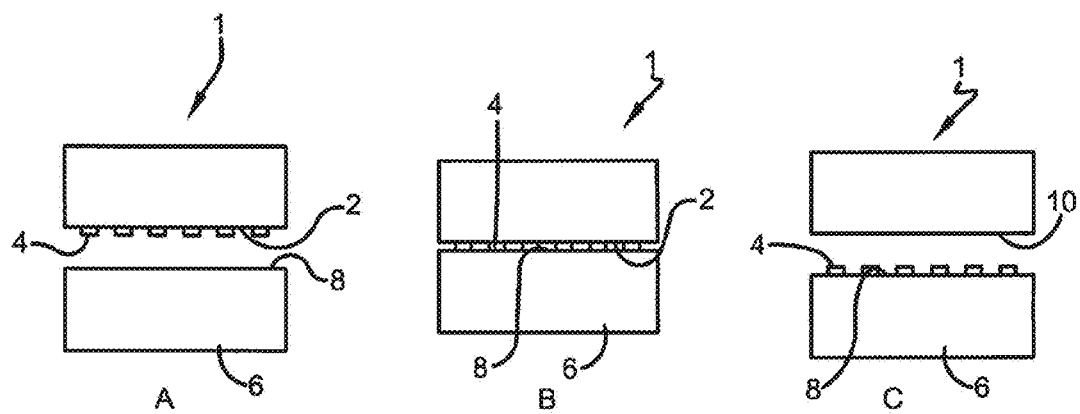
FIGS. 1A-1C are a general schematic representation of the method in accordance with this invention, showing the incorporation of magnetic elements onto a substrate surface.

A method for applying a magnetic element to a surface in accordance with this invention is schematically shown in FIGS. 1A, 1B, and 1C. FIG. 1A shows an applicator 1 having a magnetized surface 2 holding one or more magnetic elements 4. As shown in FIG. 1B, the magnetized surface 2 is brought into contact with a surface 8 of a substrate 6 to bring the magnetic element 4 into contact with the surface 8. The magnetism of surface 2 is then eliminated, which creates a (nearly) un-magnetized surface 10. As shown in FIG. 1C, the un-magnetized surface 10 is withdrawn from contact with the surface 8 and the magnetic element 4 is left behind on the surface 8.

The magnetized surface 2 can be provided by any structure that can be selectively switched between a magnetized state and an un-magnetized state. In certain cases, such as applications involving rollers and brushes, repeated switching between the magnetized and un-magnetized states may be necessary for orderly deposition of magnetic particles on target surfaces. In some embodiments, the magnetized surface 2 is selected from a mold, a coating blade, a brush, or a roller. The use of a magnetized surface 2 allows for the controlled deposition of the magnetic element 4 onto the surface 8 of the substrate 6. In some embodiments, the magnetized surface 2 becomes magnetized by a supply voltage (as, for example, in the case of an electromagnet). In other embodiments, the magnetized surface 2 becomes magnetized by permanent magnets. In all embodiments, the magnetic element 4 can be initially collected and then deposited on a surface 8 in specific shapes as determined by the shape of the magnetized surface 2. In a specific embodiment, the magnetized surface 2 is a surface of a mold for shaping and curing a tire.

The magnetized surface 2 will be employed to selectively pick up magnetic elements from a source and selectively deposit them onto the surface 8.

Figure 21:
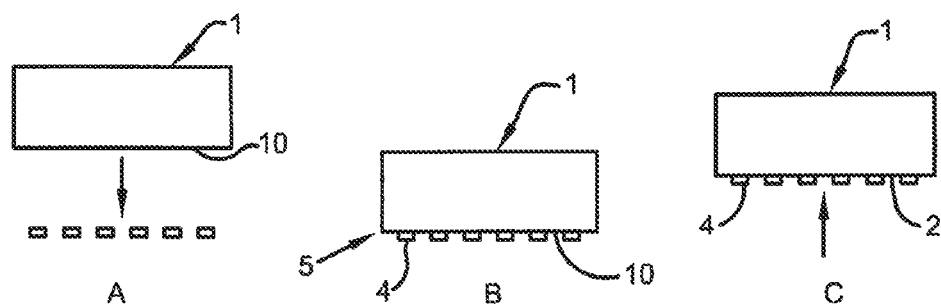
FIG. 21A-21C is a general schematic representation of the initial steps of a stepwise (or batch) type process for incorporating magnetic elements onto a substrate surface.

A stepwise press or mold type process is shown with reference to FIG. 21, which shows that the state of FIG. 1A can be reached by providing the applicator 1 first with an un-magnetized surface 10 (FIG. 21A), bringing it in contact with a source 5 of one or more magnetic elements 4 (FIG. 21B) and magnetizing the un-magnetized surface 10 thereby creating the magnetized surface 2 and picking up the magnetic element 4 (FIG. 21C). Having reached the state of FIG. 1A, the process of FIG. 1 can be carried out and all these steps repeated to manufacture desired substrates with desired magnetic elements thereon.

In some embodiments the applicators can be in the form of a blade or brush applicators, of the type generally used to coat flat surfaces. The end of the blade or brush would be entirely or include sections capable of being switched from a magnetized state to an un-magnetized state. Magnetic particles would be picked up by the magnetized blade or brush or just the magnetic sections of the blade or brush from a depositor when the blade or brush were not in contact with the surface of the substrate. Then, the magnetized blade or brush, with magnetic particles secured thereto, would be placed in contact with the substrate, and would be un-magnetized to deposit the magnetic particles the surface of the substrate. The blade or brush and the substrate move relatively to each other to coat the entire surface of the substrate with magnetic particles, or to coat just the areas of the substrate on which the magnetic particles are desired. Once the un-magnetized blade or the un-magnetic section of the blade or brush have deposited the magnetic particles, the process would begin again with the blade or sections of the blade or brush being magnetized again to allow the blade to again pick up magnetic particles for deposit.

Figure 22:
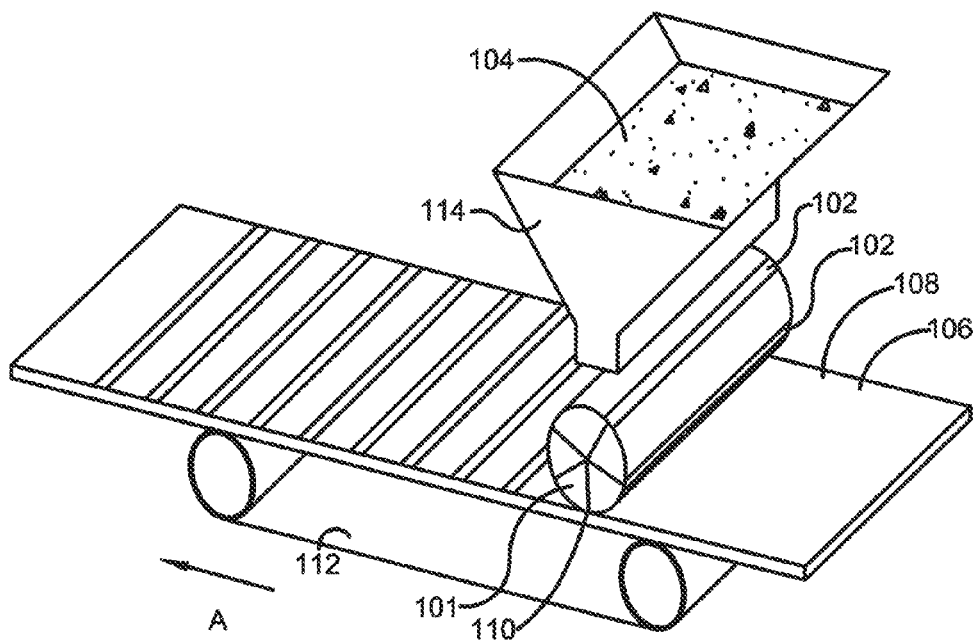
FIG. 22 is a general schematic representation of a roller applicator continuous type process for incorporating magnetic elements onto a substrate surface.

A process employing a roller applicator is shown in FIG. 22. A roller applicator 101 has multiple magnetic surface sections 102 holding one or more magnetic elements 104 that are deposited thereon from a depositor 114 when a given magnetic surface section 102 is not in contact with the surface 108 of the substrate 106. As the substrate passes under the roller applicator 101 on, for example, a conveyor belt 112, roller applicator 101 applies the desired pressure and, as a given magnetized surface sections 102 comes into contact with the surface 108, that section 102 is un-magnetized so as to become an un-magnetized surface section 110 and effect the deposition of the magnetic elements 104 on the surface 108. Thus each switchable section of the roller applicator 1 is selectively switched between a magnetized and un-magnetized state to pick up and deposit magnetic elements 104. This is a continuous process, and it will be appreciated that the switchable sections can be directly adjacent so that the particles can be laid down continuously as opposed to in sections as shown.

Figure 3:
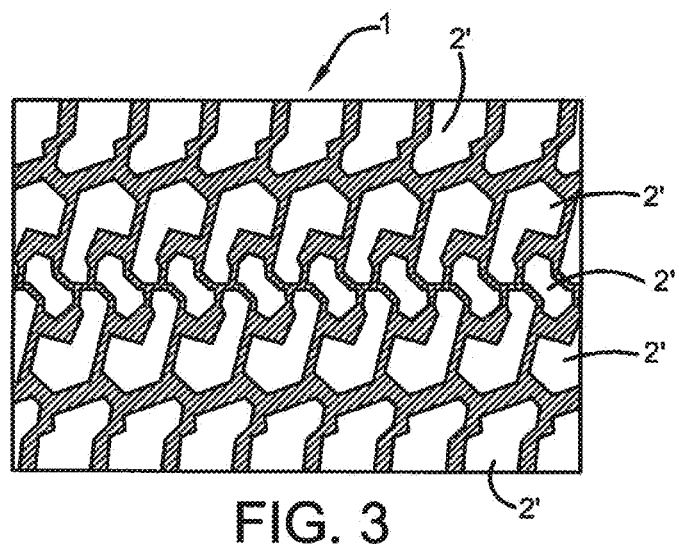
FIG. 3 is a general schematic showing an applicator having the ability to pick up and deposit magnetic elements in a pattern.

Notably, the entire surface of the applicator does not need to be magnetized and un-magnetized. Instead, portions of the surface of the applicator can be made to be switchable between a magnetized and un-magnetized state to achieve a patterned application of magnetic elements. This is shown in FIG. 3, where the surface of the applicator 1 has a plurality of magnetized surface sections 2', such that magnetic elements 4 are only picked up at those section 2'. In the figure, the pattern represents a tire tread pattern, and the magnetized surface sections 2' form the raised portions of the tread, and thus deposit the magnetic elements 4 on the outside surfaces of the raised portions. It will be appreciated that the magnetized surface sections could be positioned so that the applicator would pick up and deposit magnetic elements at the recessed portions of the tread (black portions in FIG. 3) or even on the sidewalls extending between the raised portions and the recessed portions.

In some embodiments, the magnetized surface 2 can be magnetized with a supply voltage in the range of 2 to 20 volts. In a specific embodiment, the magnetized surface 2 is magnetized with a supply voltage of 6 volts.

The magnetic element 4 can be chosen from anything that is magnetic and which will be easy to place in contact with the surface 8 of the substrate 6. In some embodiments the magnetic element 4 can be large particles, and in other embodiments the magnetic element 4 will be small particles. In some embodiments, the magnetic element 4 is selected from the group consisting of magnetic particles, magnetic whiskers, magnetic fibers, magnetic nanofibers, magnetically coated particles, magnetically coated whiskers, magnetically coated fibers, or magnetically coated nanofibers. In a specific embodiment, the magnetic element 4 is a magnetic particle chosen from nickel powder and iron powder. In yet another specific embodiment, the magnetic element 4 is an electrospun nickel nanofiber or nanofiber mat (non woven).

In some embodiments thereof, the magnetic elements are discrete particles of from about 5 nanometers to 1000 microns in their largest dimension. In other embodiments, these discrete particles are in the mircoscale (up to 1000 microns), and in other embodiments, the nanoscale (up to 1000 nanometers). In yet other embodiments, the magnetic elements are fibers, and can be discrete fibers or woven or non-woven mats/fabrics. In some embodiments, such fibers will have a diameter from about 5 nanometers to 1000 microns while being long in length.

The substrate 6 can be chosen from any non-metal substrate having a surface 8 that can be modified by the addition of a magnetic element 4. In some embodiments, the substrate 6 is selected from the group consisting of synthetic rubber, natural rubber, cured silicon, thermoplastic based materials, thermoset based materials, inorganic materials and their composites.

In some embodiments, the substrate 6 is a rubber material that forms the tread of a tire such that the surface 8 is the tread surface. In some embodiments thereof, the magnetic elements deposited on the surface 8 (tread surface) are chosen from iron, magnetite, nickel, chromium, cobalt, gadolinium and other ferromagnetic materials. In some embodiment thereof, the magnetic elements are discrete particles of from about 5 nanometers to 1000 microns in their largest dimension. In other embodiments, these discrete particles are in the mircoscale (up to 1000 microns), and in other embodiments, the nanoscale (up to 1000 nanometers). In yet other embodiments, the magnetic elements are fibers, and can be discrete fibers or woven or non-woven mats/fabrics. In some embodiments, such fibers will have a diameter from about 5 nanometers to 1000 microns while being long in length.

In a specific embodiment, the substrate 6 is a rubber material that forms the tread of a tire, and the magnetic elements 4 are ferromagnetic particles or mats.

When the magnetized surface 2 is brought into contact with the surface 8 of the substrate 6, the magnetic element 4 interacts with the surface 8 through simple van der Waals, surface tension, and electrostatic and mechanical adhesion forces between the molecules of the magnetic element 4 and the molecules of the substrate 6. In addition to these forces, in some embodiments the surface 8 of the substrate 6 can have non-zero tack strength. The tack strength of the surface 8 allows for the magnetic element 4 to better interact with the surface 8 of the substrate 6. In a specific embodiment, the surface 8 can have tack strength in the range of 10 to 72 newtons (N). For many substrates, the tack strength can be enhanced and the deposition of the magnetic elements enhanced by employing pressure and temperature. That is, the surface 8 of many substrates 6 can be made tacky by the application of heat, and, by the application of pressure, magnetic elements will be more efficiently deposited.

In some embodiments the surface 8 can be heated to a temperature to soften and even to liquefy the surface. By heating the surface 8 of the substrate 6, the magnetic element 4 will have a better interaction with the surface 8. Thus, in some embodiments, the surface 8 is heated to a temperature below the surface liquefaction temperature, but above a temperature suitable for softening the surface. The use of temperature to soften the surface will be very applicable in substrates such as thermoplastics, amorphous polymer materials and unvulcanized rubbers and elastomers.

In some embodiments, the magnetized surface 2 bearing magnetic elements 4 is pressed against the surface 8 of the substrate 6 with force. By contacting the magnetized surface 2 with the surface 8 of the substrate 6 with an applied force, the magnetic element 4 will have a better interaction with the surface 8 of the substrate 6.

In some embodiments, the magnetized surface 2 bearing magnetic elements 4 is pressed against the surface 8 of the substrate 6 with a pressure of at least 5 kPa. In other embodiments, the pressure is at least 10 kPa, in other embodiments, at least 50 kPa, and, in yet other embodiments, at least 352 kPa. In some embodiments, the magnetized surface 2 bearing magnetic elements 4 is pressed against the surface 8 of the substrate 6 with a pressure of between 5 kPa and 352 kPa. In other embodiments, the magnetized surface 2 bearing magnetic elements 4 is pressed against the surface 8 of the substrate 6 with a pressure of between 5 and 50 kPa, and in yet other embodiments, between 5 and 10 kPa.

Figure 2:
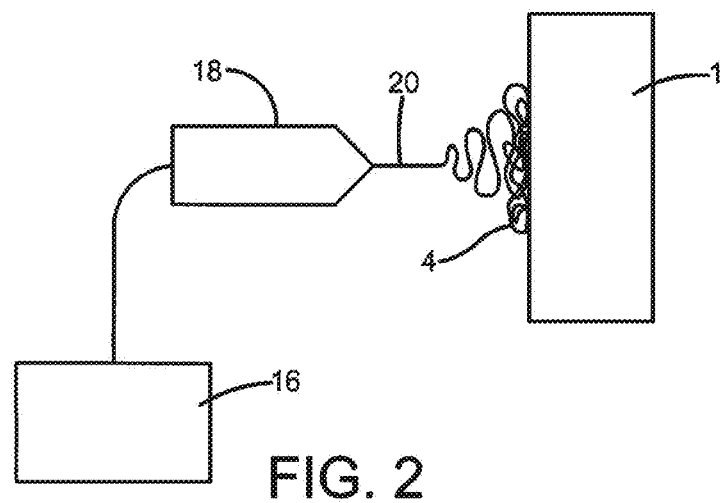
FIG. 2 is a general schematic representation of an electrospinning process.

In some embodiments of the invention, the step of providing a magnetized surface 2 holding a magnetic element 4 includes electrospinning the magnetic element 4 directly onto the surface of the applicator 1, as shown in FIG. 2. The electrospinning process is well known. An electrospinning solution is placed in a capillary or syringe 18 having its tip directed at a grounded collector, which is here a grounded surface of the applicator 1. A voltage source 16 applies a high voltage to the solution, and, as electrostatic repulsion counteracts the surface tension, a droplet at the tip of the syringe is stretched, and at sufficient voltage, a stream of solution, or charged jet 20, erupts from the surface, the point of eruption being known as the Taylor cone. The charged jet 20 is elongated by a whipping motion and is collected on the grounded surface of the applicator 1. The electrospun fiber thus produced is collected as a non-woven mat covering the surface of applicator 1. In accordance with this invention, the non-woven mat is magnetic and thus the applicator 1 can be employed as described above.

In some embodiments of this invention, nickel nanofiber mats are made from an electrospinning process and employed, as above, to be deposited on a rubber surface, particularly, in some embodiments, the surface of a tire. A solution of poly(vinyl-pyrrolidone (PVP) is added dropwise into a nickel acetate solution. This solution is electrospun to create nickel oxide. The nickel oxide nanofibers that are formed are then calcinated with a PVP/Ni acetate precursor at 700° C. Finally, the nickel oxide nanofibers are reduced with hydrogen gas to form useable nickel nanofibers.

A method for applying a magnetic element to the surface of a tire blank in accordance with this invention follows the general process outlined in FIG. 1, with the applicator 1 being a tire mold having a magnetized surface 2 holding magnetic element 4. The magnetized surface may be at the sidewall or tread portion of the tire mold. The magnetized surface may be patterned as described herein, whether to apply the magnetic element only at the raised tread portions, only at the recessed tread portions, only at the radial walls that extend from the recessed tread portions to the raised tread portions or only at the sidewall. The mold (applicator) may be a mold for receiving a green tire or its individual layers or a separate mold receiving a cured tire for application of the magnetic element or elements. The tire whether as a green tire or its individual layers or a cured tire is referred to herein as the tire blank, and this tire blank serves as the substrate 6 of the general process outlined in FIG. 1. This tire blank (substrate) provides the surface 8 that is to receive the magnetic element or elements. The magnetized tire mold is brought into contact with a surface of a tire blank to bring the magnetic element into contact with the surface. The magnetism of tire mold is then eliminated, creating an un-magnetized tire mold. The un-magnetized tire mold is then withdrawn from contact with the surface of the tire blank and the magnetic element is left behind on the surface of the tire blank.

In light of the foregoing, it should be appreciated that the present invention significantly advances the art by providing a method for applying a magnetic element to a surface that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

Materials

All experiments used Ni-102, 99.9%, 3 micron sized Nickel flake powder as the magnetic element. The powder was first immersed in a 5% HCl solution to remove any oxide layers. In all experiments, a BRE-2525-12 rectangular 2.5 inch electromagnet was used as the magnetized surface. The electromagnet was has a 2.5 in$^2$ flat surface which contained 2.28 in (58 mm) OD and 1.89 in (48 mm) ID ring shaped magnetic area at its center, and was 1.5 in in height. The electromagnet has a 12 V-DC, 8 W maximum input producing 450 lb maximum lift capacity as its source of voltage. In all experiments, a Capton sheet was attached to the surface of the electromagnet for optimum particle pick up.

The substrate materials chosen were Natural Rubber (NR), Synthetic Rubber (Butadiane-BDR) and silicon rubber (SG). For all experiments in which NR and BDR were used, the NR and BDR materials were first masticated using a two-roll mill, and final samples for particle deposition were prepared by compression molding in a steel mold to achieve 2 mm thickness for the samples. The thickness was accomplished using 4000 psi pressure and 100° C. The samples were 26×52 mm in size as placed in an aluminum frame. For all experiments in which SG was used, the SG samples were prepared simply by placing the SG material on glass slides and compressing the slides manually using another glass slide until the 2 mm substrate thickness was achieved.

Magnetic Transfer Procedures

For all experiments weighing paper was used to initially pick up particles using the electromagnet. For all experiments the Nickel powder was sprinkled on to the weighing paper, forming approximately a 9.7 mm wide and 19.5 mm long arc shape, which represented part of the ring shape of the electromagnet. Four different initial Nickel power weight value were used with approximate values of 10, 20, 40, and 60 mg (actual values may vary slightly and not reported here). For all experiments, the weighing paper containing the Nickel powder was then placed on a flat surface to allow for easier pick up by the electromagnet.

Except for the investigation into the effect of a differing supply voltage, all experiments applied a supply voltage of 6V to the electromagnet. Next in all experiments the magnetized electromagnet was then placed on the weighing paper containing the Nickel powder; then after waiting for 5 minutes, the magnetized electromagnet was manually lifted off the weighing paper containing the Nickel powder and was then placed on to the substrate surface. Once the magnetized electromagnet was placed onto the substrate surface, the supply voltage to the electromagnet was stopped and the magnetized electromagnet became un-magnetized and the Nickel powder was deposited onto the surface of the substrate. Subsequently, the Nickel powder remaining on the weighing paper, the Nickel powder remaining on Capton sheet cover on the electromagnet, and the nickel powder deposited onto the substrate surface was calculated.

Figure 4:
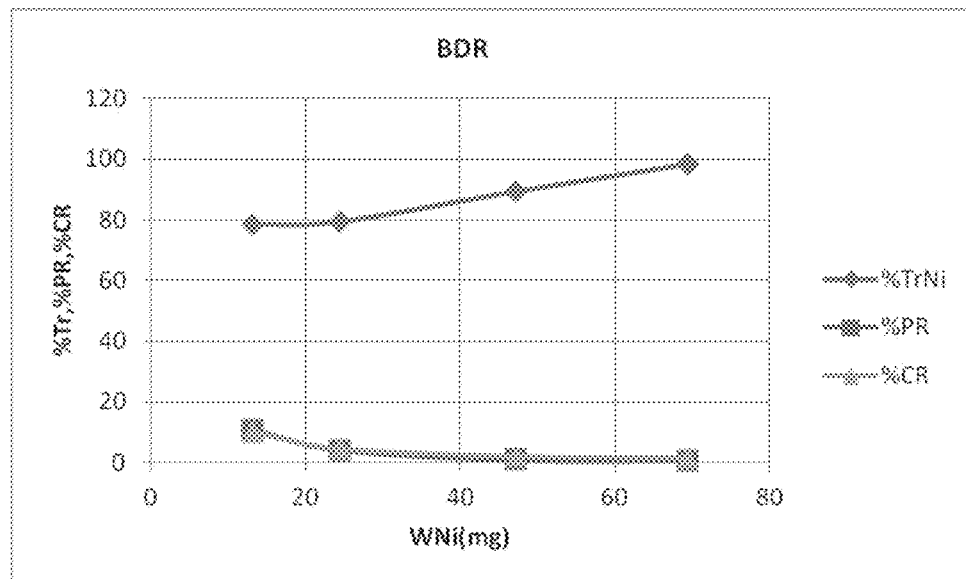
FIG. 4 is a graph showing the initial electromagnetic transfer efficiency for Ni powder transfer to Butadiene Rubber (BDR) substrate surfaces in terms of percent transferred (% Tr) Ni powder, where % PR and % CR represent percentages for the Ni powder remaining on weighing paper and Capton sheet cover on the electromagnet, respectively and the horizontal axis represents the initial amount of Ni powder on weighing paper, to be transferred.
Figure 5:
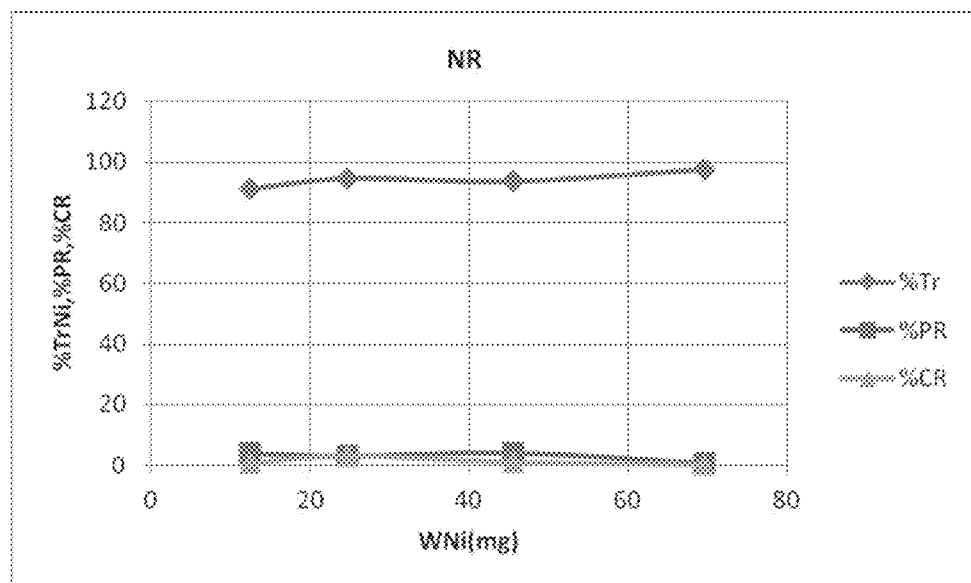
FIG. 5 is a graph showing the initial electromagnetic transfer efficiency for Ni powder transfer to Natural Rubber (NR) substrate surfaces in terms of percent transferred (% Tr) Ni powder, where % PR and % CR represent percentages for the Ni powder remaining on weighing paper and Capton sheet cover on the electromagnet, respectively, and the horizontal axis represents the initial amount of Ni powder on weighing paper, to be transferred.
Figure 6:
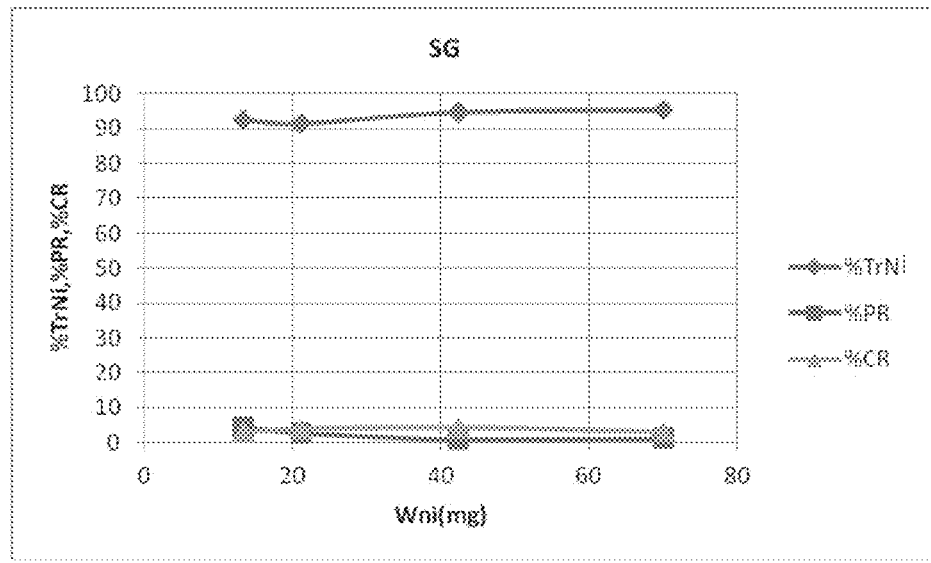
FIG. 6 is a graph showing the initial electromagnetic transfer efficiency for Ni powder transfer to Silicon Rubber (SG) substrate surfaces in terms of percent transferred (% Tr) Ni powder, where % PR and % CR represent percentages for the Ni powder remaining on weighing paper and Capton sheet cover on the electromagnet, respectively, and the horizontal axis represents the initial amount of Ni powder on weighing paper, to be transferred.
Figure 7:
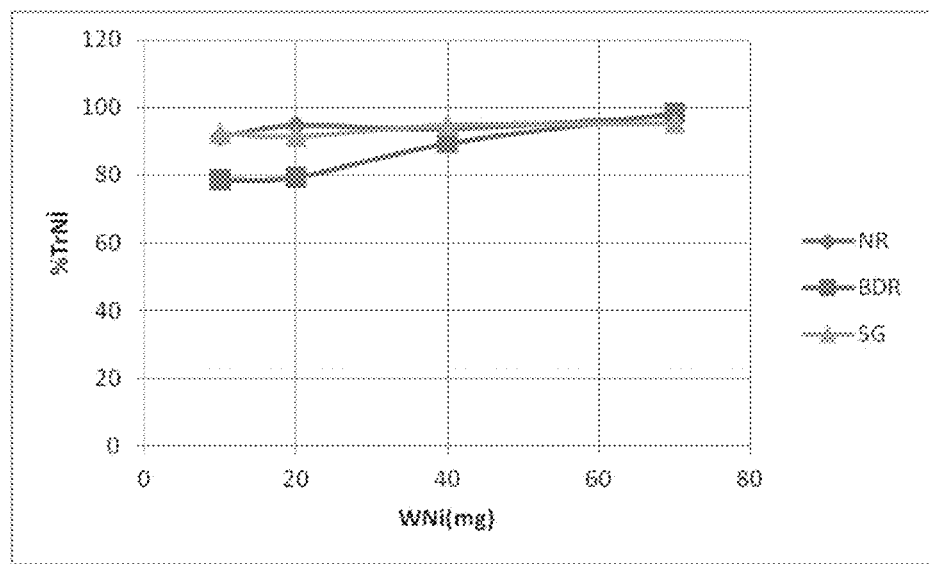
FIG. 7 is a graph showing the initial electromagnetic transfer efficiency for Ni powder transfer to Butadiene Rubber (BDR), Natural Rubber (NR) and Silicon Rubber (SG) substrate surfaces in terms of percent transferred (% Tr) Ni powder, where the horizontal axis represents the initial amount of Ni powder on weighing paper, to be transferred.
Figure 8:
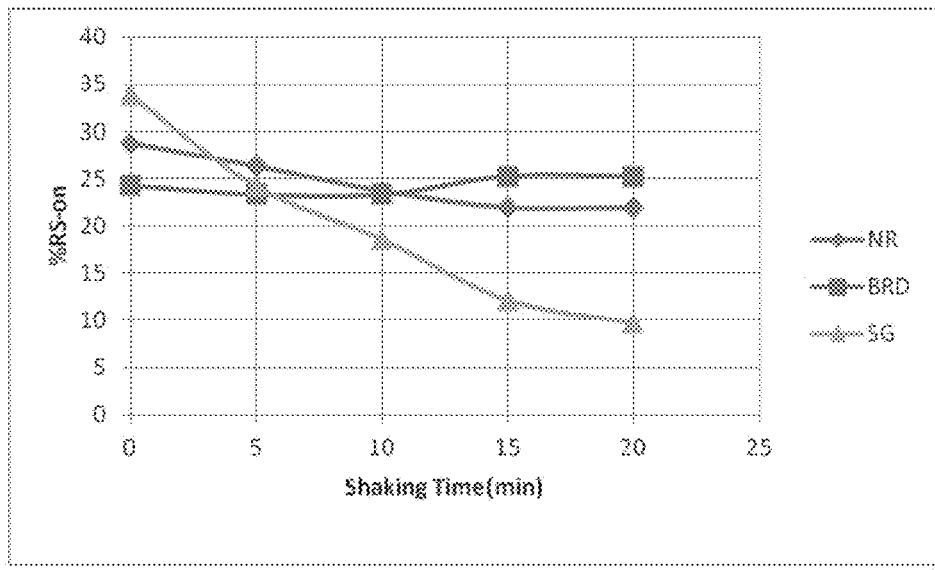
FIG. 8 is a graph showing the percent electromagnetic transfer efficiency on BDR, NR and SG substrate surfaces as functions of shaking time for about 10 mg of initial Ni powder weight to be transferred electromagnetically.
Figure 9:
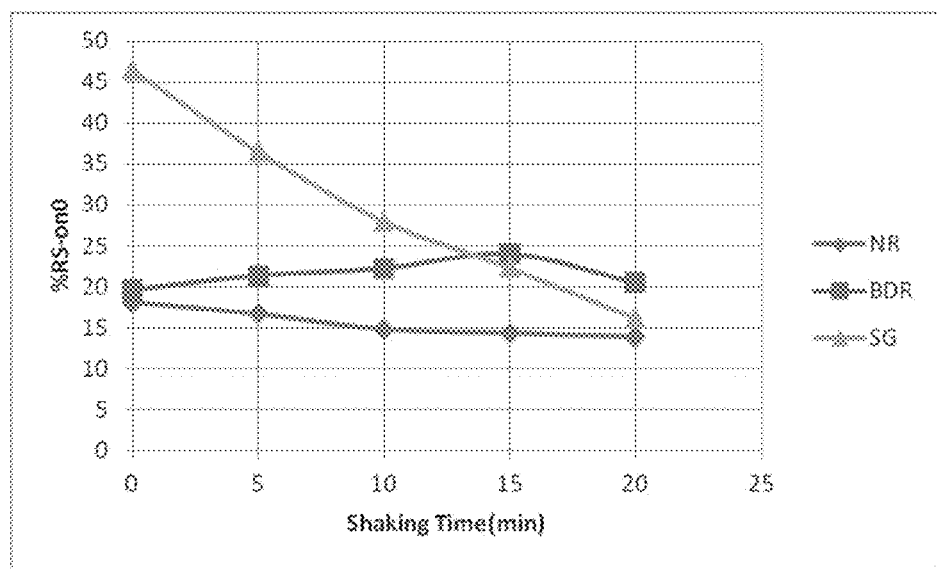
FIG. 9 is a graph showing the percent electromagnetic transfer efficiency on BDR, NR and SG substrate surfaces as functions of shaking time for about 20 mg of initial Ni powder weight to be transferred electromagnetically.
Figure 10:
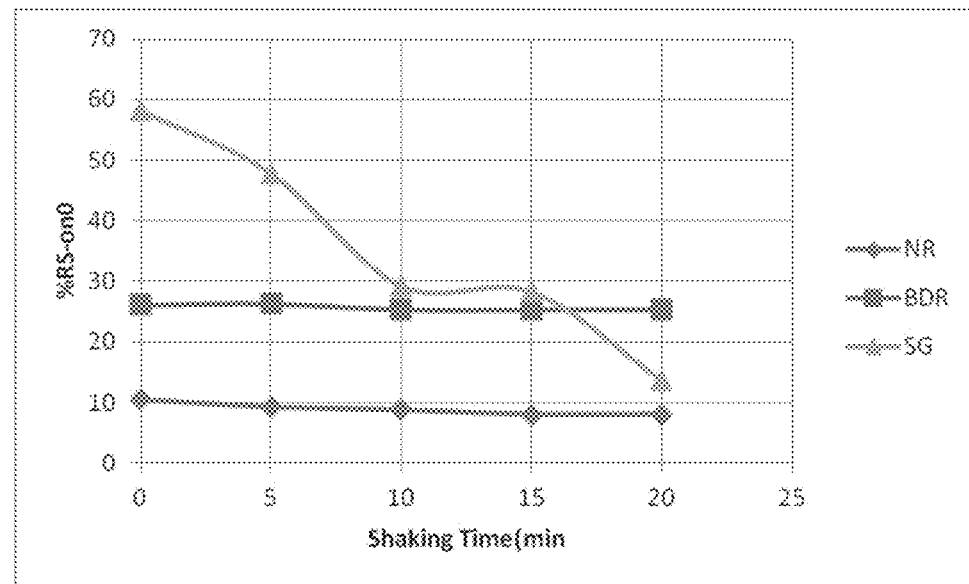
FIG. 10 is a graph showing the percent electromagnetic transfer efficiency on BDR, NR and SG substrate surfaces as functions of shaking time for about 40 mg of initial Ni powder weight to be transferred electromagnetically.
Figure 11:
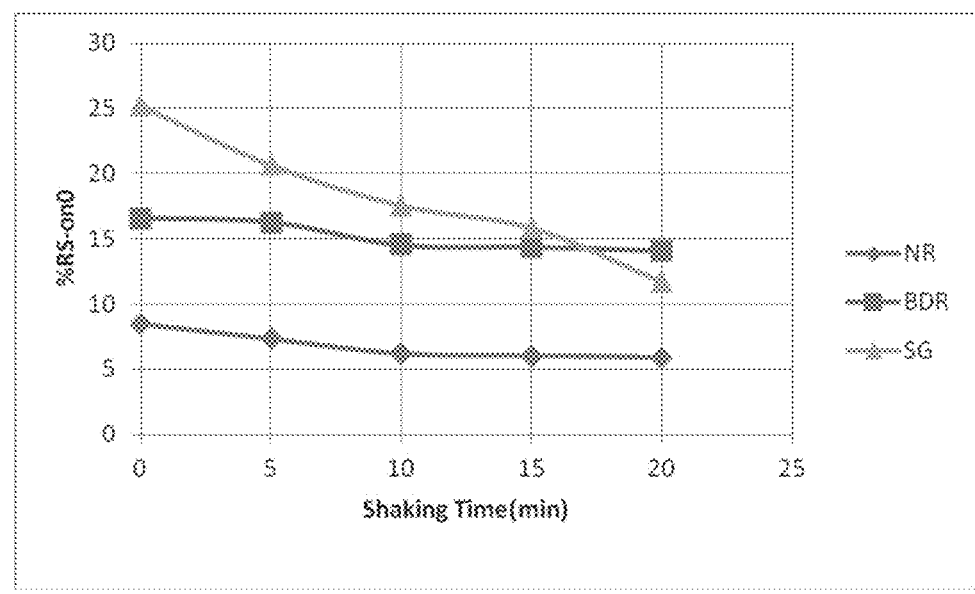
FIG. 11 is a graph showing the percent electromagnetic transfer efficiency on BDR, NR and SG substrate surfaces as functions of shaking time for about 70 mg of initial Ni powder weight to be transferred electromagnetically.

FIGS. 4-6 show the initial electromagnetic transfer efficiency for Nickel powder transfer to a BDR, NR, and SG substrate surface in terms for percent transferred (% TR) of Nickel Powder and % PR and % CR percentages for the Nickel Powder, representing Nickel powder remaining on the weighing paper and Capton sheet cover. FIG. 7 shows a comparison of the electromagnetic transfer capability as shown independently in FIGS. 4-6. FIG. 7 shows an 80% or higher capability to electromagnetically transfer magnetic particles onto substrate surfaces.

Powder Loss

To assess any loss of Nickel powder subsequent to its deposition on the surface of the substrate, a shaking experiment was performed using a shaker apparatus. The shaker used was an RX-86 Sieve Shaker which provided 278+/−10 oscillations per minute. For these experiments, the substrate containing the electromagnetically deposited Nickel powder was turned upside down without any shaking to determine any loss of Nickel powder from the substrate surface by weighing. Next, the substrate was then placed within an aluminum frame and then the frame was placed upside down onto the frame of the shaker, and was then shaken for durations of 5, 10, 15, and 20 minutes and weighed after each duration.

FIGS. 8-11 show the percent electromagnetic transfer efficiency on BDR, NR, and SG substrate surfaces as functions of shaking time for ~10, ~20, ~40 and ~70 mg of initial Nickel powder weight to be transferred electromagnetically. The percentages were calculated in comparison to the initial Nickel powder weights to be transferred electromagnetically. Actual powder weight transferred electromagnetically and remaining on the substrate surfaces after 20 minutes of shaking is shown in Table 1. The results reveal that the powder weight transferred electromagnetically and remaining on substrate surfaces after 20 minutes of shaking increases nonlinearly with initial powder weight and seem to reach a plateau after a certain initial powder weight. Table 1 also reveals that the NR substrates consistently retained less powder in comparison to the BDR substrate. This may be due to the fact that the BDR has higher tack in comparison to NR at room temperature, as revealed by subsequent tack experiments.

TABLE 1

Actual Powder Weight Transferred Electromagnetically and Remaining on Substrate Surfaces after 20 min Shaking

| | | Initial Powder Weight to be Transferred (mg) | | | |
|---|---|---|---|---|---|
| | | 10 | 20 | 40 | 70 |
| | | Actual Powder Weight Transferred Electromagnetically and Remaining on Substrate Surfaces after 20 min Shaking (mg) | | | |
| Substrate Material | BDR | 2.5 | 4.1 | 10.1 | 9.9 |
| | NR | 2.2 | 2.8 | 3.2 | 4.1 |
| | SG | 0.1 | 3.2 | 5.5 | 8.2 |

The Effect of the Value of the Supply Voltage

For these experiments 40 mg of Nickel powder was sprinkled on to weighing paper, forming approximately a 9.7 mm wide and 19.5 mm long arc shape, which represented part of the ring shape of the electromagnet. One experiment was done applying 6V of supply voltage, another experiment was done applying 10V of supply voltage, and a final experiment was done applying 15V of supply voltage. Next in all experiments the magnetized electromagnet was then placed on the weighing paper containing the Nickel powder; then after waiting for 5 minutes, the magnetized electromagnet was manually lifted off the weighing paper containing the Nickel powder and was then placed onto the surface of a NR substrate. Once the magnetized electromagnet was placed onto the surface of the NR substrate, the supply voltage to the electromagnet was stopped and the magnetized electromagnet became un-magnetized and the Nickel powder was deposited onto the surface of the NR substrate. Subsequently, the Nickel powder remaining on the weighing paper, the Nickel powder remaining on capton sheet cover on the electromagnet, and the nickel powder deposited onto the surface of the NR substrate was calculated.

Figure 12:
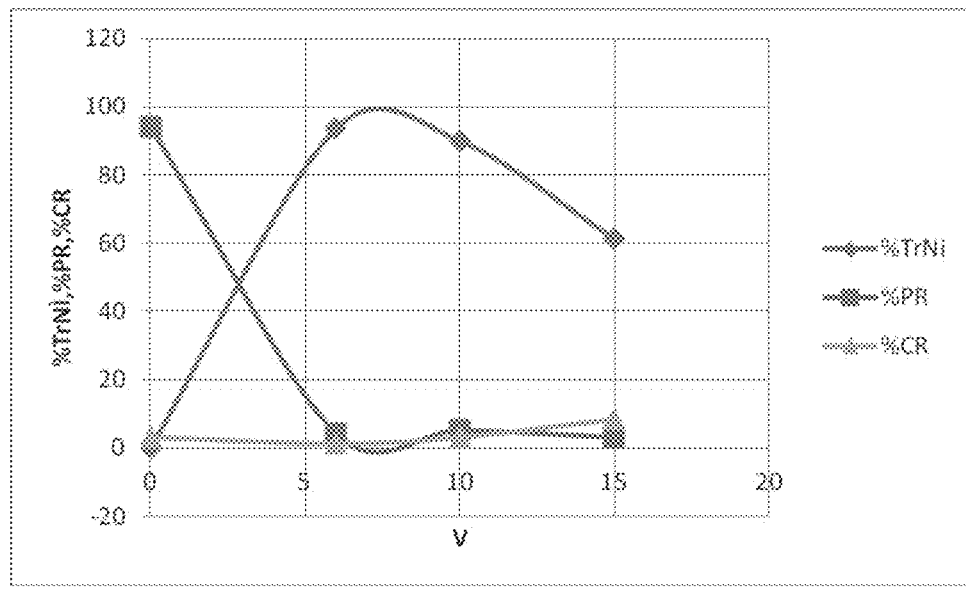
FIG. 12 is a graph showing the effect of electromagnet voltage supply on particle transfer efficiency (% TrNi) as measured on NR substrates using about 40 mg Ni powder initially to be transferred electromagnetically.

FIG. 12 reveals that a 6V supply voltage is the optimum supply voltage for electromagnetic transfer. This may be due to the fact that voltage levels higher than 6V may increase the residual magnetism in Nickel powder which results in larger agglomerate formation with the Nickel powder, thus reducing the transfer efficiency of the powder loss due to falling off of the magnet by gravity during transfer.

The Effect of Substrate Temperature

In order to assess the effects of substrate temperature on the amount of Nickel Powder transferred, two different experiments were performed. In the first experiment, the substrate was heated to 166° C. for 30 minutes, and then after the substrate was allowed to cool to room temperature, the Nickel powder was transferred onto the substrate surface as taught above. In the second experiment, the Nickel powder was transferred onto the substrate surface as taught above and then the substrate was heated to 166° C. for 30 minutes. These experiments were performed using only the NR and BDR substrates.

Figure 13:
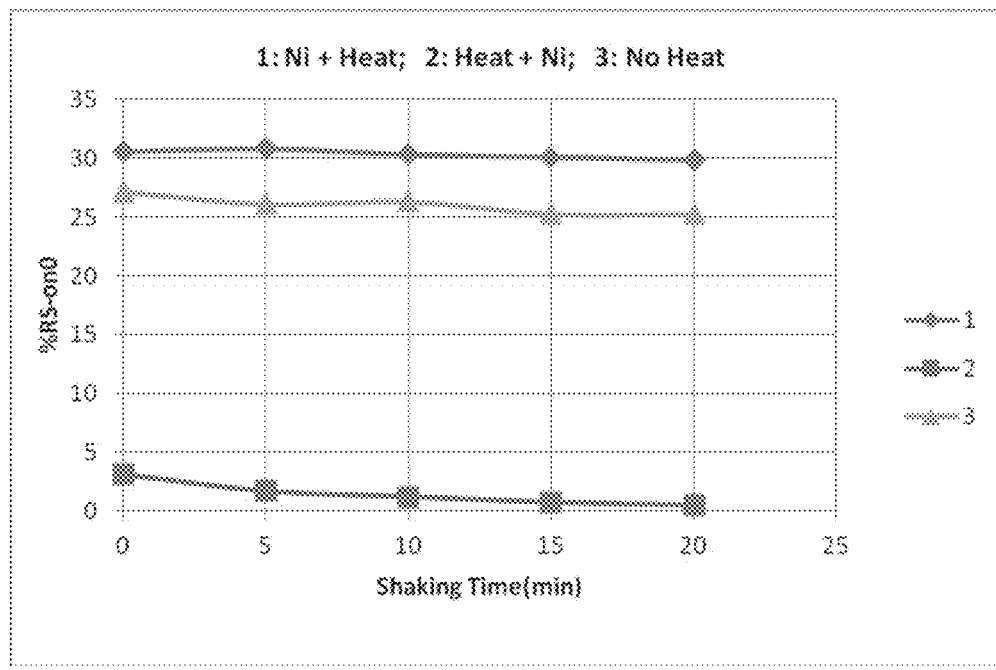
FIG. 13 is a graph showing the effects of heating BDR substrates, before or after transfer, on efficiency of electromagnetic particle transfer, where the initial weight of the Ni powder to be transferred was about 40 mg.
Figure 14:
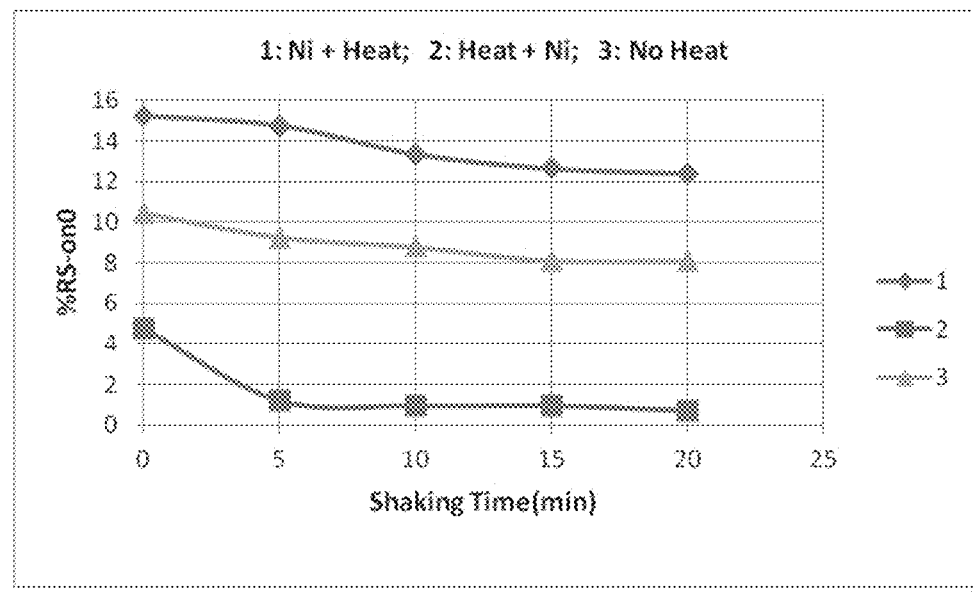
FIG. 14 is a graph showing the effects of heating NR substrates, before or after transfer, on efficiency of electromagnetic particle transfer, where the initial weight of the Ni powder to be transferred was about 40 mg.

FIGS. 13 and 14 show the effects that heating the substrates has on the efficiency of electromagnetic particle transfer on BDR and NR substrates, respectively. The results reveal that, in comparison to electromagnetic transfer at room temperature, heating the substrate surface to 166° C. and then cooling it to room temperature prior to particle transfer reduces the electromagnetic particle transfer efficiency. This may be due to the fact that oxidation occurs on the substrate surface, which reduces the surface activity and thus the tack and adhesion forces, resulting in less amount of particles remaining attached to the substrate surfaces. The increase in the amount of particles retained when the substrates were heated subsequently to the electromagnetic particle transfer, in comparison to no heating, may be due to the increased relaxation processes coupled with compressive deformations in the rubber substrates at elevated temperatures, which may have locked the particles on substrate surfaces by mechanical means, such as by mechanical adhesion.

The Effect of Substrate Surface Tack

To assess the tack of the surface of the substrate, an Instron 5567 test machine was used to compression-tension test the samples. These experiments were performed using circular shaped samples of NR and BDR having approximately 0.2 cm$^2$ of surface area. The experiments were performed using either 1 or 10 kN load cells attached to the Instron machine. The samples were placed directly onto the steel compression platens of the Instron machine, thus the measured tack represents adhesion to steel. The experiments were started with a compression extension mode at 50 mm/min rate until the prescribed compressive hold was reached. Compressive hold loads of 0.1, 0.2, and 1 kN were applied in different experiments for a duration of 10 seconds. The crosshead was then automatically raised in tensile extension mode using a rate of 500 mm/min. In most experiments, the samples typically separated from the moving upper platen when the adhesion force was defeated.

Figure 15:
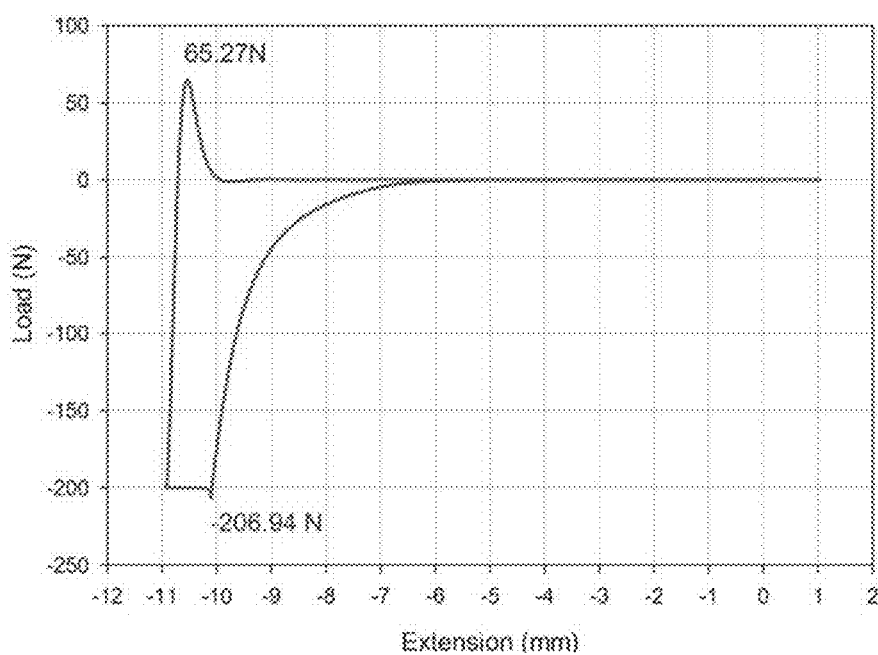
FIG. 15 is a graph showing tack experiment output for BDR substrate held at 0.2 kN set compression level for 10 sec, revealing 65.3 N tack (adhesion) force.
Figure 16:
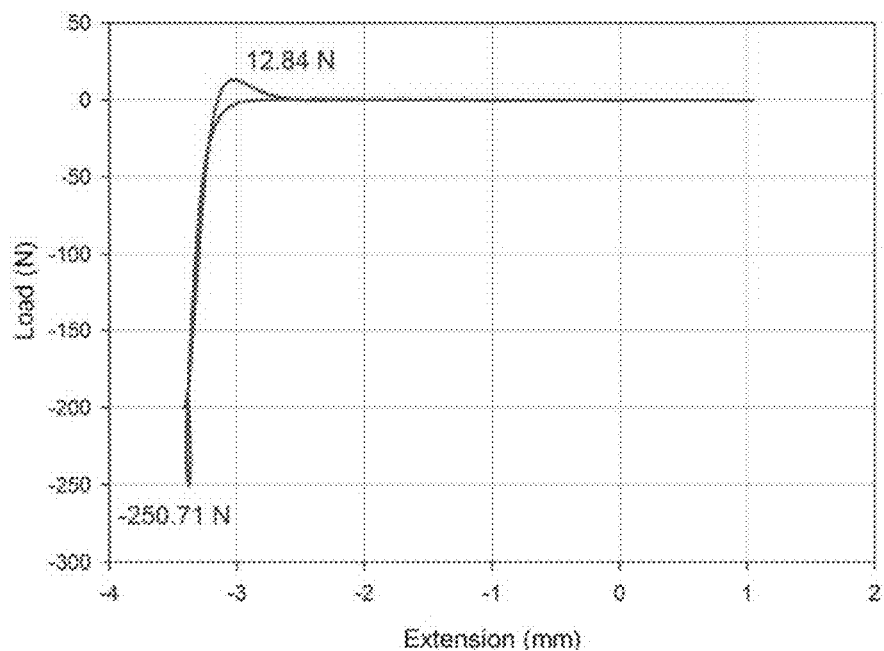
FIG. 16 is a graph showing a tack experiment output for NR substrate held at 0.2 kN set compression level for 10 sec, revealing 12.8 N tack (adhesion) force.

FIGS. 15 and 16 show the tack experiment results for BDR and NR substrates, respectively. As indicted on the top left sections of the graphs, the tack (adhesion) force after being pressed at 0.2 kN for 10 seconds are 65.3 N for the BDR substrate and 12.8 N for the NR substrate, as measured by a 10 kN load cell. The compressive force values reported on the lower left sides of the graphs reveal momentary overshoot beyond the 0.2 kN set compressive levels, varying depending on the nature of the substrate material. Comparison of FIGS. 15 and 16 reveal much higher tack for the BDR substrate in comparison to the NR substrate, which provides a strong reason for higher powder retention by the BDR substrate in comparison to the NR substrate as reported in Table 1.

Figure 17:
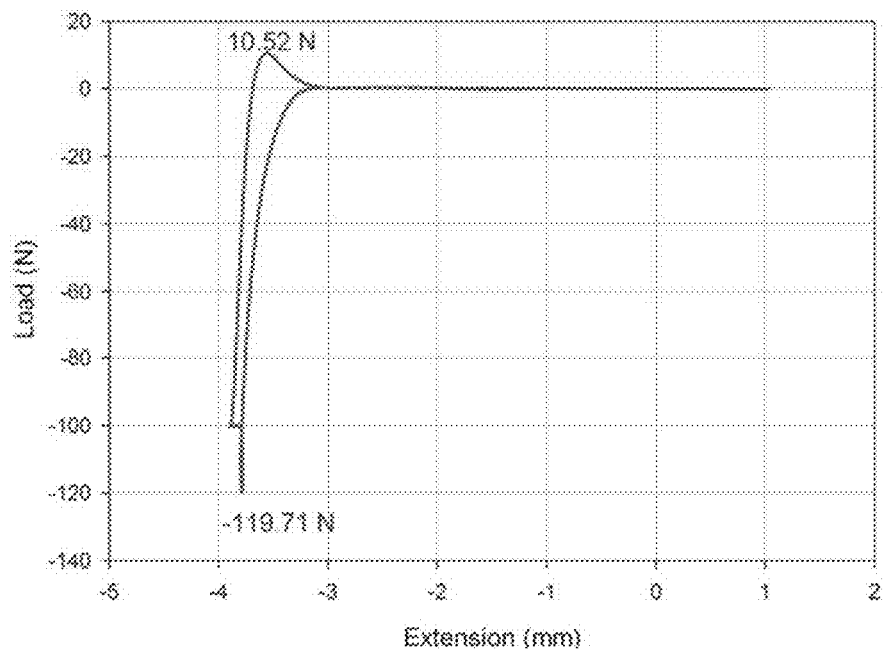
FIG. 17 is a graph showing tack experiment results for NR substrates heated to 166° C. and held for 30 min, and then cooled to room temperature and held at 0.1 kN set compression level for 10 sec, revealing 10.5 N tack (adhesion) force.
Figure 18:
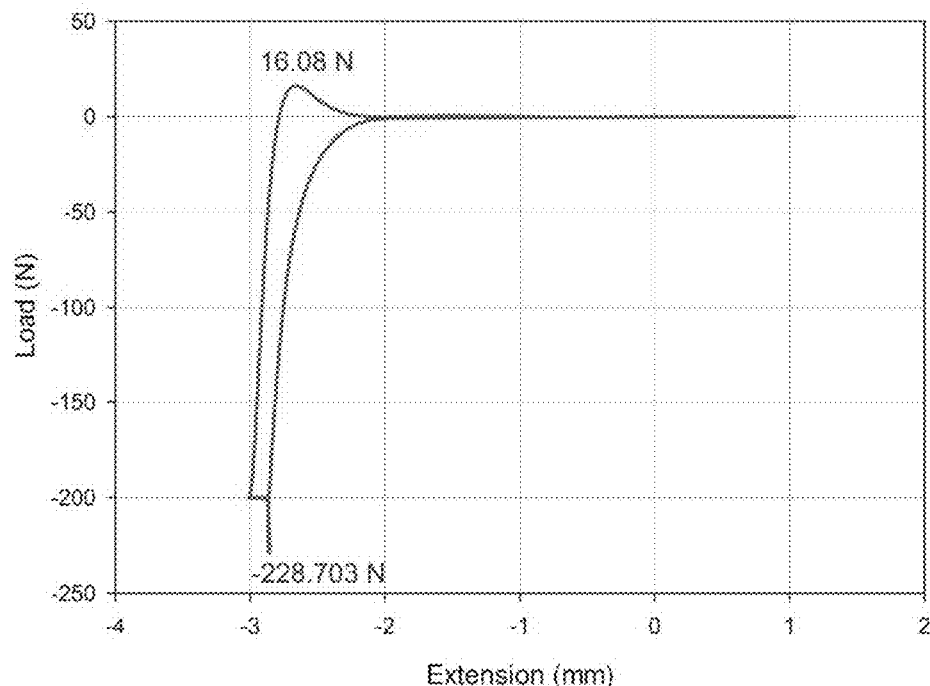
FIG. 18 is a graph showing tack experiment results for NR substrates heated to 166° C. and held for 30 min, and then cooled to room temperature and held at 0.2 kN set compression level for 10 sec, revealing 16.1 N tack (adhesion) force.
Figure 19:
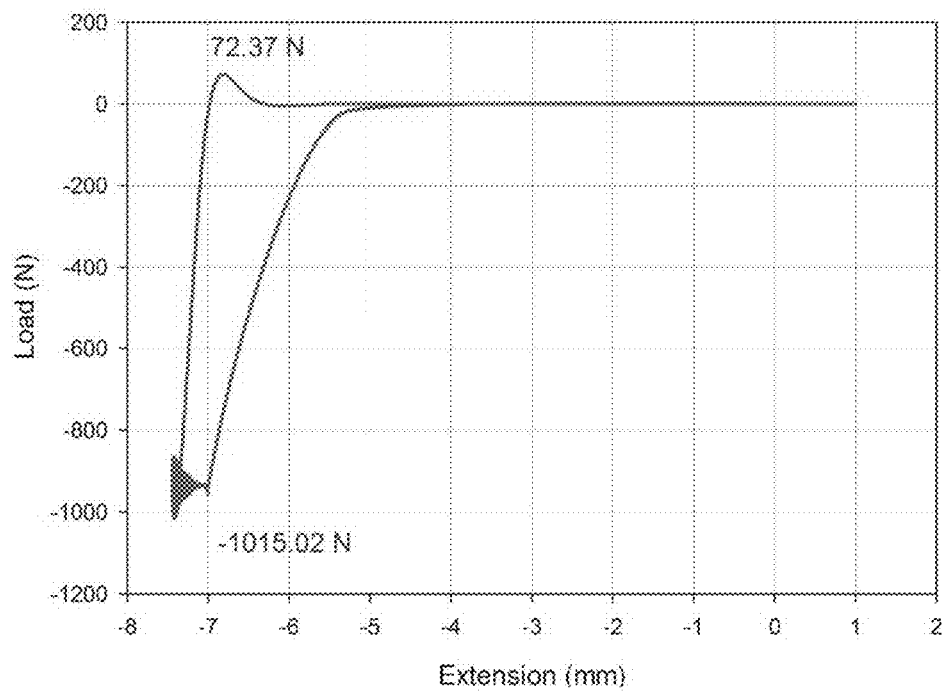
FIG. 19 is a graph showing tack experiment results for NR substrates heated to 166° C. and held for 30 min, and then cooled to room temperature and held at 1 kN set compression level for 10 sec, revealing 72.4 N tack (adhesion) force.

FIGS. 17, 18 and 19 show tack experiment results for NR substrates heated to 166° C. and held for 30 minutes, and then cooled to room temperature, for 0.1 kN, 0.2 kN, and 1 kN set to compression levels at 10 second hold. As indicated on the top left sections of the graphs, the tack (adhesion) force after being pressed at for 0.1 kN, 0.2 kN, and 1 kN for 10 seconds are 10.5 N, 16.1 N, and 72.4 N, respectively, as measured by a 10 kN load cell. Comparison of FIGS. 17-19 show much higher tack for the NR substrates when the compression set is increased from 0.1 kN to 1 kN, thus revealing a higher powder retention capacity over and beyond the levels shown in Table 1 when the electromagnetic transfer is performed under higher pressure levels, such as in cases typically encountered in molding and other similar operations.

The Effect of Pressure on Particle Transfer

To assess the effect of pressure on the efficiency of the electromagnetic particle transfer, experiments were performed using a starting weight of approximately 70 mg of Nickel Powder. These experiments were performed using only the NR substrates. Subsequent to placing the magnetized electromagnet containing the Nickel Powder over the NR substrate, a weight weighing approximately 107 pounds was placed over the electromagnet, and then the supply voltage to the electromagnet was stopped and the magnetized electromagnet became un-magnetized and the Nickel powder was deposited onto the surface of the substrate. The percentage of powder retained by the NR substrate was then measured at intervals of 0, 30, 60 and 90 minutes. The thickness of the NR substrate was also recorded, which was initially 2.75 mm at 0 minutes, and the thickness went down to 2.65 mm at 30 minutes, down to 2.34 mm at 60 minutes, and finally down to 2.28 mm at 90 minutes.

Figure 20:
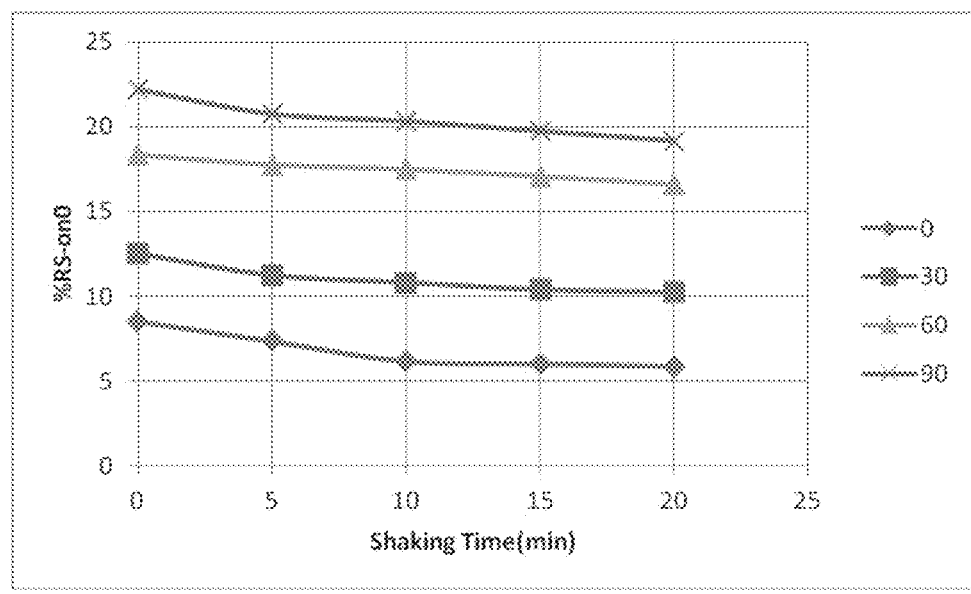
FIG. 20 is a graph showing the levels of percent Ni powder remaining on NR substrates after shaking, if the electromagnetic transfer is finalized under 352 kPa compressive pressure over a period of time (30, 60 and 90 min), where the initial weight of Ni powder to be transferred was about 70 mg.

The results of the tack experiments reported above showed a much higher tack for the NR substrates when the compression set was increased from 0.1 kN to 1 kN. This shows that there is a higher powder retention capacity when the electromagnetic transfer is performed under higher pressure levels, such as in the cases typically encountered in molding and other similar operations. FIG. 20 shows the levels of percent Nickel powder remaining on NR substrates after 20 minutes of shaking, when compressed under a 107 pound load for up to 90 minutes. As expected, the amount of magnetic particle retained on the substrate surface increases substantially when the electromagnetic transfer is finalized under pressure over a period of time. The amount of Nickel powder remaining on the surface of the NR substrate goes up from 4.1 mg to 13.4 mg when a compressive force of 107 pounds is applied for 90 minutes.

What is claimed is:

1. A method for applying a magnetic element to a surface, comprising the steps of:
    providing a magnetized surface holding a magnetic element;
    providing a substrate having a surface to be modified by the addition of the magnetic element;
    contacting the magnetized surface with the surface of the substrate so as to bring the magnetic element into contact with the surface of the substrate;
    thereafter eliminating the magnetism of the magnetized surface, thus creating a un-magnetized surface;
    thereafter withdrawing the un-magnetized surface from contact with the surface of the substrate, thereby leaving behind the magnetic element on the surface of the substrate.

2. The method of claim 1, wherein the said step of providing a magnetized surface holding a magnetic element includes electrospinning the magnetic element directly onto the magnetized surface.

3. The method of claim 2, wherein the magnetic element is chosen from the group consisting magnetic whiskers, magnetic fibers, magnetic nanofibers, magnetically coated particles, magnetically coated whiskers, magnetically coated fibers, magnetically coated nanofibers and combinations thereof.

4. The method of claim 1, wherein the magnetized surface is a magnetized tire mold and wherein the substrate is a tire blank.

5. The method of claim 4, wherein the tire blank has tack strength in the range of 10 N to 72 N.

6. The method of claim 4, wherein the said step of providing a magnetized surface holding a magnetic element includes electrospinning the magnetic element directly onto the magnetized tire mold.

7. The method of claim 1, wherein the magnetic element is selected from the group consisting of magnetic whiskers, magnetic fibers, magnetic nanofibers, magnetically coated particles, magnetically coated whiskers, magnetically coated fibers, and magnetically coated nanofibers and combinations thereof.

8. The method of claim 7, wherein the substrate having a surface has tack strength in the range of 10 N to 72 N.

9. The method of claim 7, wherein the substrate having a surface is heated to a temperature to soften and even to liquefy the surface from between environmental temperature and surface liquefaction temperature.

10. The method of claim 7, wherein the substrate is in the form of a tire.

11. The method of claim 1, wherein the magnetized surface is magnetized with a supply voltage in the range of 2 volts to 20 volts direct current, or 110 or higher volts alternating current.

12. The method of claim 7, wherein the magnetic element is chosen from nickel powder, iron powder and combinations thereof.

13. The method of claim 7, wherein the magnetic element is electrospun nickel in the form of a nanofiber mat.

14. The method of claim 1, wherein the magnetized surface is selected from the group consisting of a mold, a coating blade, a brush, and a roller.

15. The method of claim 14, wherein the mold is a tire mold.

16. The method of claim 1, wherein the substrate having a surface is selected from the group consisting of a synthetic rubber substrate, a natural rubber substrate, a cured silicon substrate, ferromagnetic particles, metallic particles, thermoplastic based materials, thermoset based materials, inorganic materials and combinations thereof.

17. The method of claim 1, wherein the magnetized surface is contacted with the surface of the substrate with a pressure of between 5 kPa to 352 kPa.

18. The method of claim 4, wherein the tire blank is made from the group consisting of synthetic rubber, natural rubber, cured silicon, and combinations thereof.

* * * * *